United States Patent [19]

Kuwahara et al.

[11] Patent Number: 5,003,626
[45] Date of Patent: Mar. 26, 1991

[54] DUAL BALANCED OPTICAL SIGNAL RECEIVER

[75] Inventors: Hideo Kuwahara; Terumi Chikama; Tetsuya Kiyonaga, all of Kawasaki; Chiaki Ohsawa, Tokyo, all of Japan

[73] Assignee: Fujitsu Limited, Kawasaki, Japan

[21] Appl. No.: 433,431

[22] Filed: Nov. 8, 1989

Related U.S. Application Data

[63] Continuation of Ser. No. 64,058, Jun. 19, 1987, abandoned.

[30] Foreign Application Priority Data

Jun. 20, 1986 [JP] Japan .................................. 61-142837
Jul. 14, 1986 [JP] Japan .................................. 61-163717

[51] Int. Cl.$^5$ ............................................. H04B 10/06
[52] U.S. Cl. ...................................... 455/619; 455/616
[58] Field of Search ............... 455/606, 607, 616, 617, 455/619

[56] References Cited

U.S. PATENT DOCUMENTS 3,971,930 7/1976 Fitzmaurice et al. ............... 455/616
4,506,388 3/1985 Monerie ............................ 455/616
4,718,120 1/1988 Tzeng ............................... 455/619

FOREIGN PATENT DOCUMENTS 0168192 1/1986 European Pat. Off. ............ 455/616
0250819 1/1988 European Pat. Off. ............ 455/616
0079330 4/1986 Japan .............................. 455/612
8607513 12/1986 PCT Int'l Appl. ................. 455/619

Primary Examiner—Donald O. Woodiel
Assistant Examiner—L. Van Beek
Attorney, Agent, or Firm—Staas & Halsey

[57] ABSTRACT

An optical signal receiver comprising an optical mixing-/polarization splitting unit for producing IF optical signals having two orthogonally polarized components, an optical signal receiving unit for producing four corresponding IF electric signals, and a combining circuit for combining two IF electric signals having one polarization with the other two IF electric signals having the other polarization, suppressing fluctuation of the polarization and the intensity noise of the related local optical signal. The intensity noise suppression is also effective for IF electric signals having a higher frequency range.

22 Claims, 16 Drawing Sheets

DUAL BALANCED OPTICAL SIGNAL RECEIVER

This is a continuation of copending application Ser. No. 07/064,058, filed on June 19, 1987.

BACKGROUND OF THE INVENTION

1. Field of the Invention

The present invention relates to a dual balanced optical signal receiver for use in a practical coherent lightwave communication system.

2. Description of the Related Art

In a lightwave communication system, a direct detection method is usually employed in which a received optical signal transmitted via an optical transmission line is directly supplied to an optical receiving element and then transformed thereby into an electric signal. In a coherent lightwave communication system, a so-called homodyne detection method or a heterodyne detection method is known, in which a very pure laser device is used as a local oscillation optical source and the local oscillation optical signal is mixed with the received optical signal. This method has a superior receiver sensitivity to that of the aforesaid direct detection method. Accordingly, in the coherent lightwave communication system, it is possible to enlarge the repeater spacing, and thus reduce the number of repeaters. Further, where the coherent lightwave communication system is introduced in a subscriber network, it is possible to increase the number of branches, and thus realize an economical arrangement of the optical transmission lines.

Recently, in such homodyne detection or heterodyne detection techniques, there has arisen a demand for a suppression of a reduction in interference efficiency due to a fluctuation of a polarization plane between the received optical signal and the local oscillation optical signal, and a reduction in receiver sensitivity due to an intensity noise of the local oscillation optical signal (hereinafter referred to as intensity noise).

To cope with the above demand, various techniques have been proposed in the prior art, as will be explained in detail hereinafter. The problems occurring in the prior art optical signal receiver are, first it is difficult to increase receiver sensitivity since a part of both the received optical signal and the local oscillation optical signal is left unused, and second, it is difficult to maintain a suppression of intensity noise contained in a local oscillation optical signal regardless of a fluctuation of the polarization.

SUMMARY OF THE INVENTION

An object of the present invention is to provide a dual balanced optical signal receiver which can realize a highly stable reception of a coherent lightwave signal. A further object of the present invention is to provide a dual balanced optical signal receiver which can realize a highly stable reception of a coherent lightwave signal regardless of variances in operation characteristics between a pair of optical signal receiving means.

The above objects are attained by combining a mixer balanced optical signal receiver and a polarization-diversity optical signal receiver.

BRIEF DESCRIPTION OF THE DRAWINGS

The present invention will be more apparent from the following description with reference to the accompanying drawings, wherein.

DESCRIPTION OF THE PREFERRED EMBODIMENTS

Before describing the preferred embodiments, a prior art optical signal receiver will be explained for reference.

Figure 1:
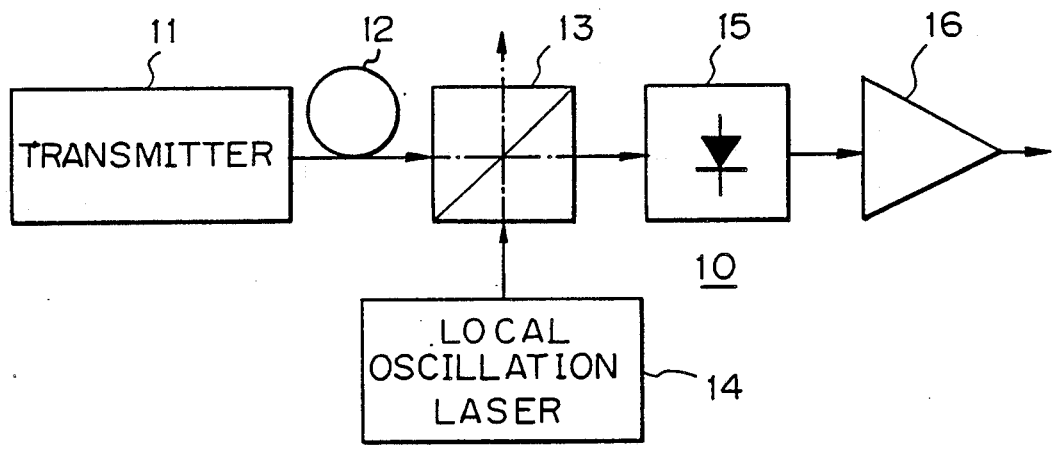
FIG. 1 is a schematic block diagram of a conventional coherent lightwave communication system.

FIG. 1 is a schematic block diagram of a conventional coherent lightwave communication system. The system of the figure is operated under a homodyne detection method or a heterodyne detection method. In this system, an optical signal is transmitted, via a single mode fiber 12, from an optical signal transmitter to an optical signal receiver 10. In the receiver 10, both the received optical signal and a local oscillation optical signal from a local oscillation laser 14 are mixed at a photomixer 13. The thus mixed optical signal is projected onto an optical signal receiving means 15, such as a photodiode, and then transformed into a corresponding electric signal to be applied to an amplifier 16. The output signal from the amplifier 16 is an intermediate frequency (IF) signal of, for example, several GHz.

In the above coherent lightwave communication system, the transmitted optical signal from the transmitter 11 is obtained by previously modulating, directly or indirectly, a laser to a linear polarization lightwave. When the linear polarization lightwave travels along a long distance optical transmission line composed of an ordinary single mode fiber 12, the lightwave changes to a elliptical polarization lightwave or the polarization plane of the lightwave is rotated. This is called a fluctuation of polarization. When the fluctuation is large, an interference efficiency at the photomixer 13 between the local oscillation optical signal and the received optical signal is deteriorated, and in the worst case a normal reception of the transmitted optical signal can not be realized.

Figure 2:
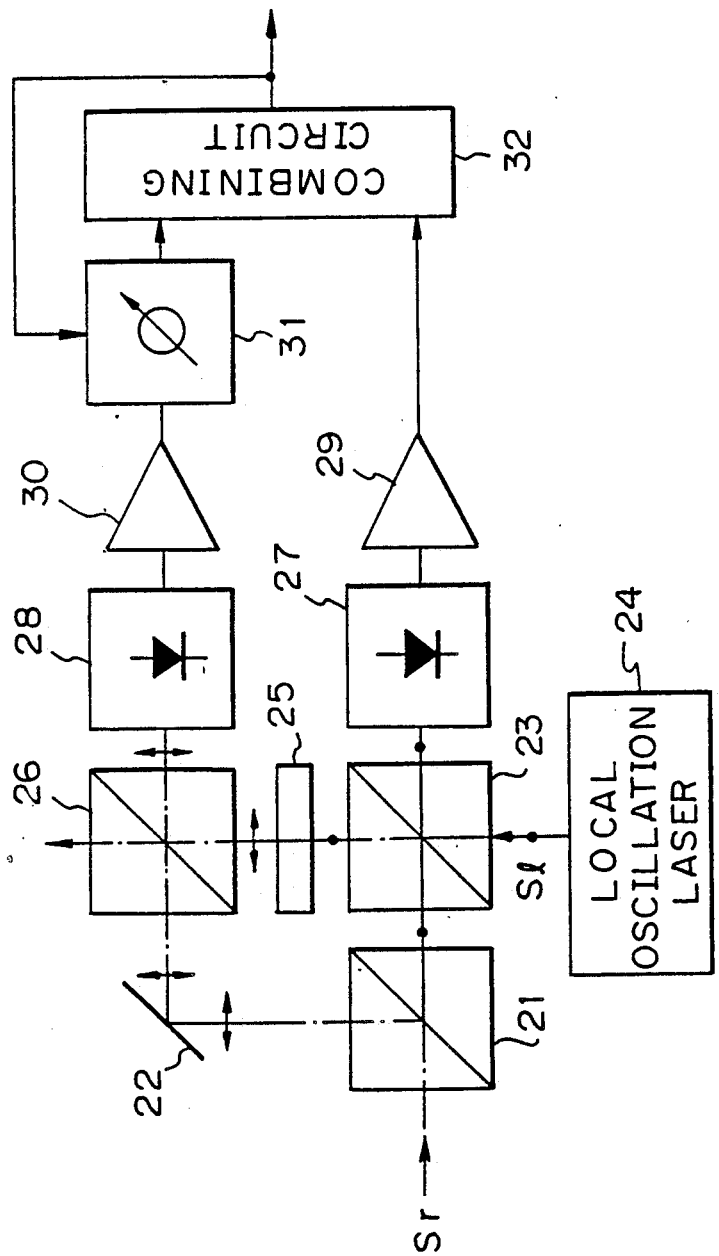
FIG. 2 is a schematic block diagram of a prior art optical system.

To overcome the above mentioned problem of reduced interference efficiency, a polarization-diversity reception method was disclosed in, for example, "FOURTH INTERNATIONAL CONFERENCE ON INTEGRATED OPTICS AND OPTICAL FIBER COMMUNICATION, Main Conference Technical Digest, June 27-30, 1983, Tokyo Japan, FIG. 1. FIG. 2 is schematic block diagram of a prior art optical receiver operated under such a polarization-diversity reception method. In FIG. 2, a received optical signal $S_r$, sent via an optical transmission line (12 in FIG. 1), is split into two orthogonally polarized components by a polarization splitting element 21. The split polarization components are commonly mixed, at a photomixer 23 and a photomixer 26, respectively, with the local oscillation optical signal produced by a local oscillation laser 24. In this case, the two orthogonally polarized components for mixing with the received optical signal $S_r$ are created by the same local oscillation optical signal $S_l$. To this end, a halfwave plate 25 is located between the photomixers 23 and 26. As is known, the halfwave plate is used for changing an S polarization lightwave into a P polarization lightwave, and vice versa. Also, a reflecting plate 22 is located to project one of the polarization lightwaves to the corresponding photomixer 26.

The optical signals output from the photomixers 23 and 26 are projected onto optical signal receiving elements 27 and 28, respectively and transformed into corresponding electric signals. These electric signals are then fed to a combining means. That is, in the combining means, the electric signals are amplified by amplifiers 29 and 30. The amplified output signal from the amplifier 29 and the thus amplified output signal via phase shifter 31 for a phase adjustment from the amplifier 30, are combined by a combining circuit 32. The phase shifter 31 is controlled to produce a maximum combined output signal.

Thus, in the polarization-diversity receiver of FIG. 2, the electric signals can be obtained from at least either the optical signal receiving element 27 or the element 28, even when the fluctuation of the polarization is relatively large, and thus a normal reception of the transmitted optical signal can be guaranteed, to a certain extent.

Figure 3:
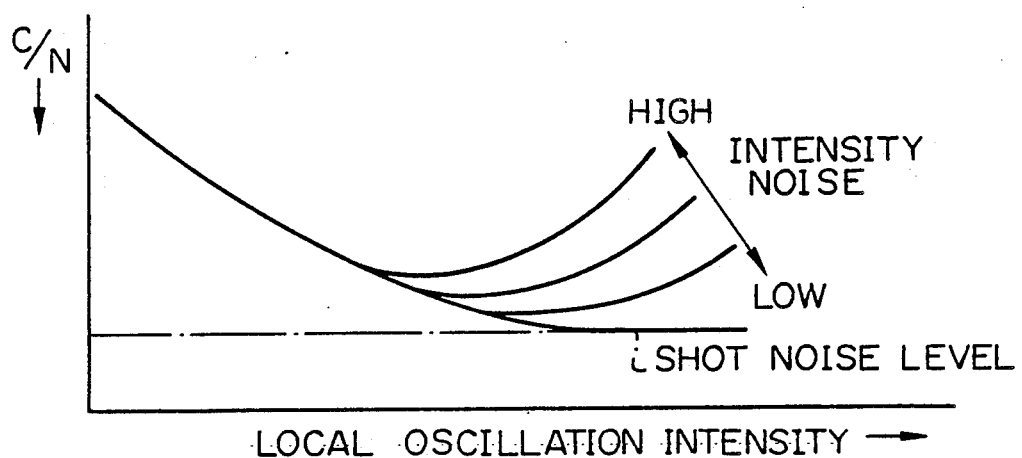
FIG. 3 is a graph exhibiting C/N characteristic curves in terms of the intensity noise of the local oscillation signal.

In the construction of the coherent lightwave receiver, a factor other than the above-mentioned interference efficiency is also very important and must be taken into consideration. This factor is a so-called intensity noise contained in the local oscillation optical signal $S_l$. FIG. 3 is a graph showing C/N characteristic curves in terms of the noise intensity of the local oscillation signal. The ordinate indicates a carrier-to-noise (C/N) ratio in dB, and the abscissa indicates an intensity of a lightwave of the local oscillation optical signal $S_l$. In the receiver of FIG. 1 or 2, the stronger the intensity of a lightwave from the local oscillation laser 14 or 24, the greater the improvement in the C/N ratio, i.e., a minimum detectable power. It can be seen from the abscissa of the graph that a C/N value becomes better. It is, however, important to note that, even if the intensity of the lightwave is further strengthened, the C/N value cannot reach a shot noise level, which is an ideal level, in a case where the intensity noise is relatively high due to, for example, an instability of the local oscillation laser 14 or 24. As a result, the C/N characteristic is deteriorated (i.e., a an increase of the curve seen at the right side of the Figure). In such circumstances, a local oscillation lightwave having a low intensity noise must be used to improve the C/N characteristic, or the intensity noise per se must be suppressed.

To implement the above, a balanced mixing method has been proposed in, for example, "OPTICS LETTERS, Vol. 8, No. 8, August 1983, pages 419-421, in an article entitled, "Local-oscillator excess-noise suppression for homodyne and heterodyne detection".

Figure 4:
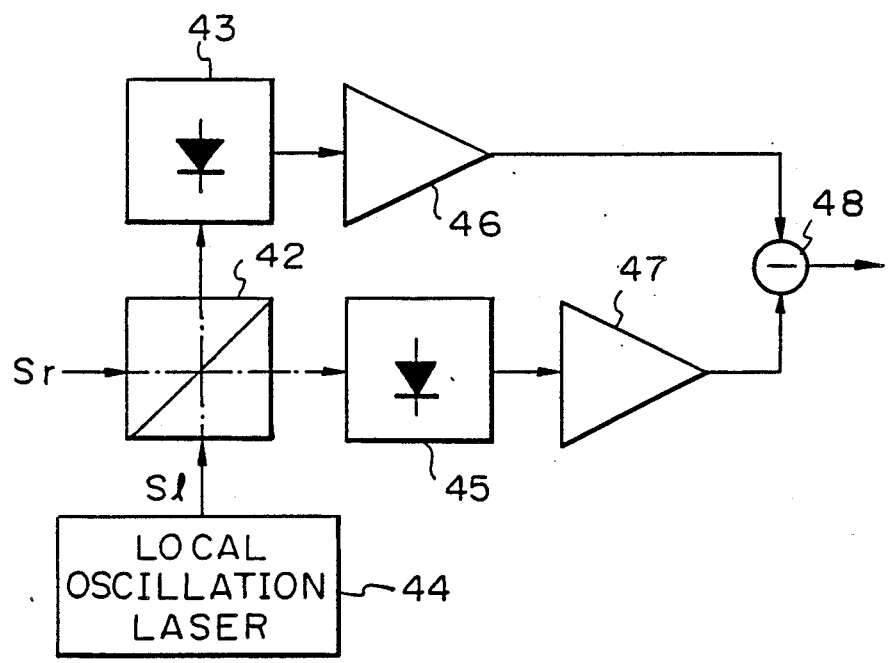
FIG. 4 is a schematic block diagram of a known balanced-mixer receiver.

FIG. 4 is a schematic block diagram of a known balanced-mixer receiver. In FIG. 4, a received optical signal $S_r$ is mixed at a photomixer 42 with a local oscillation optical signal $S_l$ produced from a local oscillation laser 44. A photomixer 42 can divide the optical power from a local oscillation laser 44 by two, and output two optical signals having the same power. Accordingly, two optical signals are output from the photomixer 42 and projected onto optical signal receiving elements 43 and 45, to be transformed into corresponding electric signals. There electric signals are then applied, via respective amplifiers 46 and 47, to a subtractor 48. The optical signals output from the photomixer 42, i.e., beat signal components between the optical signals $S_r$ and $S_l$, are shifted in phase by 180°, while the intensity noise components contained in the two beat signals remain in phase with each other. Therefore, when the two beat signals from the amplifiers 46 and 47 are subtracted from each other, the beat signal components per se are added to each other, but the intensity noise components per se are cancelled. Thereby, the intensity noise of the local oscillation optical signal $S_l$ can be largely suppressed.

Figure 5:
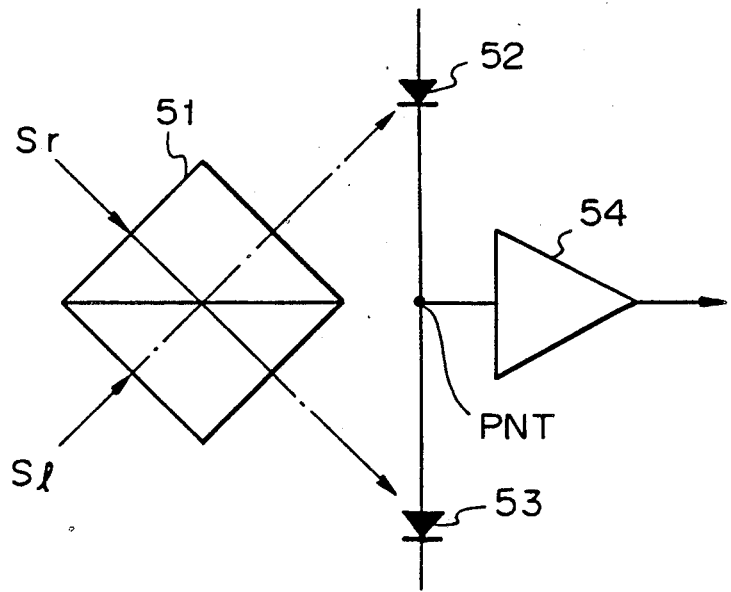
FIG. 5 is a view of a balanced-mixer receiver of FIG. 4.

FIG. 5 is a view of a balanced-mixer receiver of FIG. 4 A received optical signal $S_r$ and a local oscillation optical signal $S_l$ are simultaneously applied to a photomixer 42 and the thus mixed optical signals are then projected onto respective optical signal receiving elements 52 and 53 connected in series, and an electric signal appearing at an intermediate connecting point PNT is applied to an amplifier 54. The series connection of the optical signal receiving elements 52 and 55 operates in an identical manner to the subtractor 48 of FIG. 4, and therefore, the beat signal components are added while the intensity noise components are cancelled.

Figure 6:
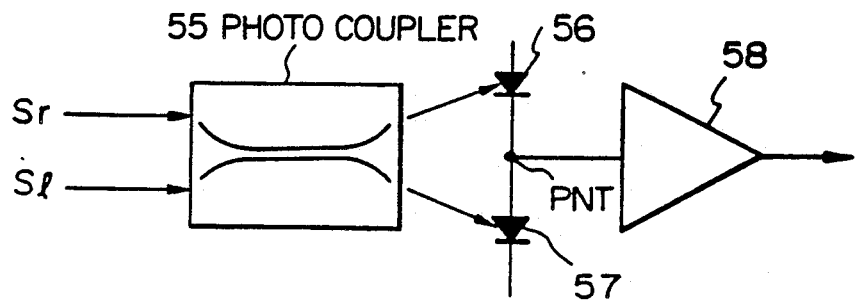
FIG. 6 is another view of a balanced-mixer receiver of FIG. 4.

FIG. 6 is another view of a balanced-mixer receiver of FIG. 4. In FIG. 6, a 3 dB photocoupler 55 is used as the aforesaid photomixer to which both the optical signals $S_r$ and $S_l$ are applied. The thus mixed output optical signals are projected onto the optical signal receiving elements 56, 57 and the related electric signal appearing at the intermediate connecting point PNT is amplified by an amplifier 58, so that an addition of the two beat signal components and a cancellation of the intensity noise components can be realized, as shown in FIG. 5.

Returning to FIGS. 1 and 2, a problem arises in that a part of the mixed optical signal are left unused, and this causes a loss of the beat signal. For example, in FIG. 1, the mixed optical output signal radiated from the top of the photomixer 13 is discarded. Similarly, in FIG. 2, the mixed optical output signal radiated from the top of the photomixer 23 is discarded. Further, the C/N (carrier to noise) of each optical signal receiver of FIGS. 1 and 2 is deteriorated due to the intensity noise of the local oscillation optical signal. Accordingly, in the prior art, it is difficult to increase the sensitivity of a receiver, as mentioned previously. Further, returning to FIG. 4, the prior art optical signal receiver can suppress the intensity noise, but the interference efficiency varies in accordance with the fluctuation of the polarization, whereby the receiver sensitivity is also varied, and in the worst case, i.e., when the polarization angle of one of the signals $S_r$ and $S_l$ becomes perpendicular to that of the other signal, it is impossible to maintain a normal reception of the transmitted optical signal. To cope with the above problems, the optical signal receiver of the present invention is created by combining both the polarization diversity technique and the balanced mixing technique.

Figure 7:
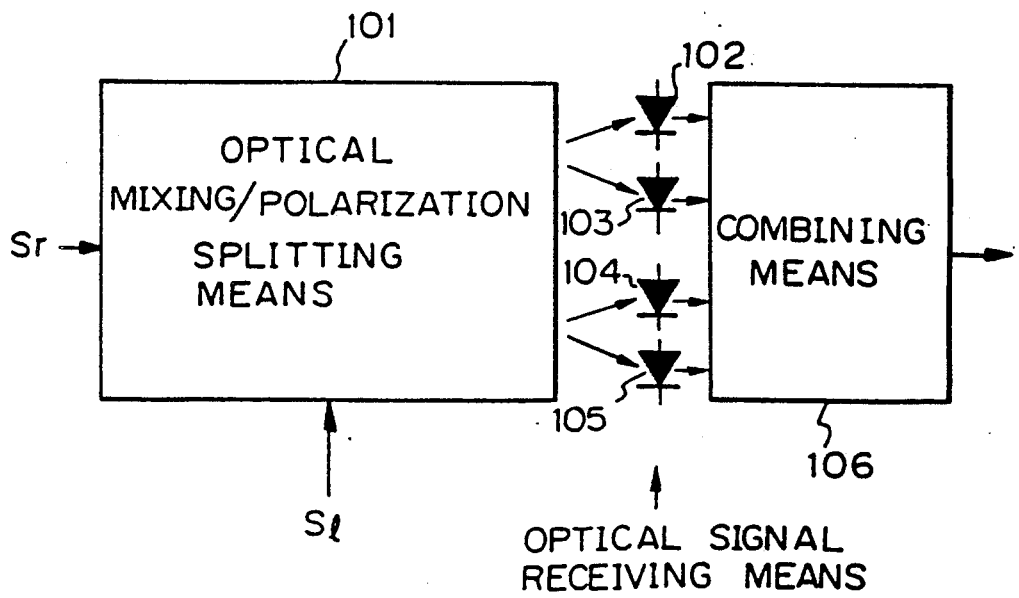
FIG. 7 illustrates a principle construction of a dual balance-optical signal receiver according to the present invention.

FIG. 7 illustrates a principle construction of a dual balanced optical signal receiver according to the present invention. The construction of the dual balanced optical signal receiver comprises mainly an optical mixing/polarization splitting means 101, optical receiving means 102 through 105, and a combining means 106. The means 101 produces optical signals having an intermediate frequency (IF) by mixing a received optical signal $S_r$ with a local oscillation optical signal $S_l$, and then splits the thus mixed signal into two orthogonally polarized components. Alternatively, the means 101 produces optical signals by splitting the received optical signal into two orthogonally polarized components and then mixing each of the thus split orthogonally polarized components with the local oscillation signal $S_l$. Thus, the optical mixing/polarization splitting means 101 produces four polarized components. The four polarized components are applied to respective optical signal receiving elements 102 through 105, i.e., the optical signal receiving means, so that the polarized components are transformed into corresponding electric signals having an intermediate frequency (IF). The IF electric signals are received by the combining means 106 and the two signals having the same polarization (S) are combined, and the other two signals having the other polarization (P) are also combined.

The dual balanced optical signal receiver operates in such a manner that a differential signal is obtained between two IF electric signals each having the intensity noise components (contained in a local oscillation optical signal) which are in phase, i.e., an undesirable intensity noise. Further, the related differential signals are combined in phase to realize the polarization diversity reception, and thereby the undesirable effect due to the fluctuation of the polarization can be suppressed.

Figure 8:
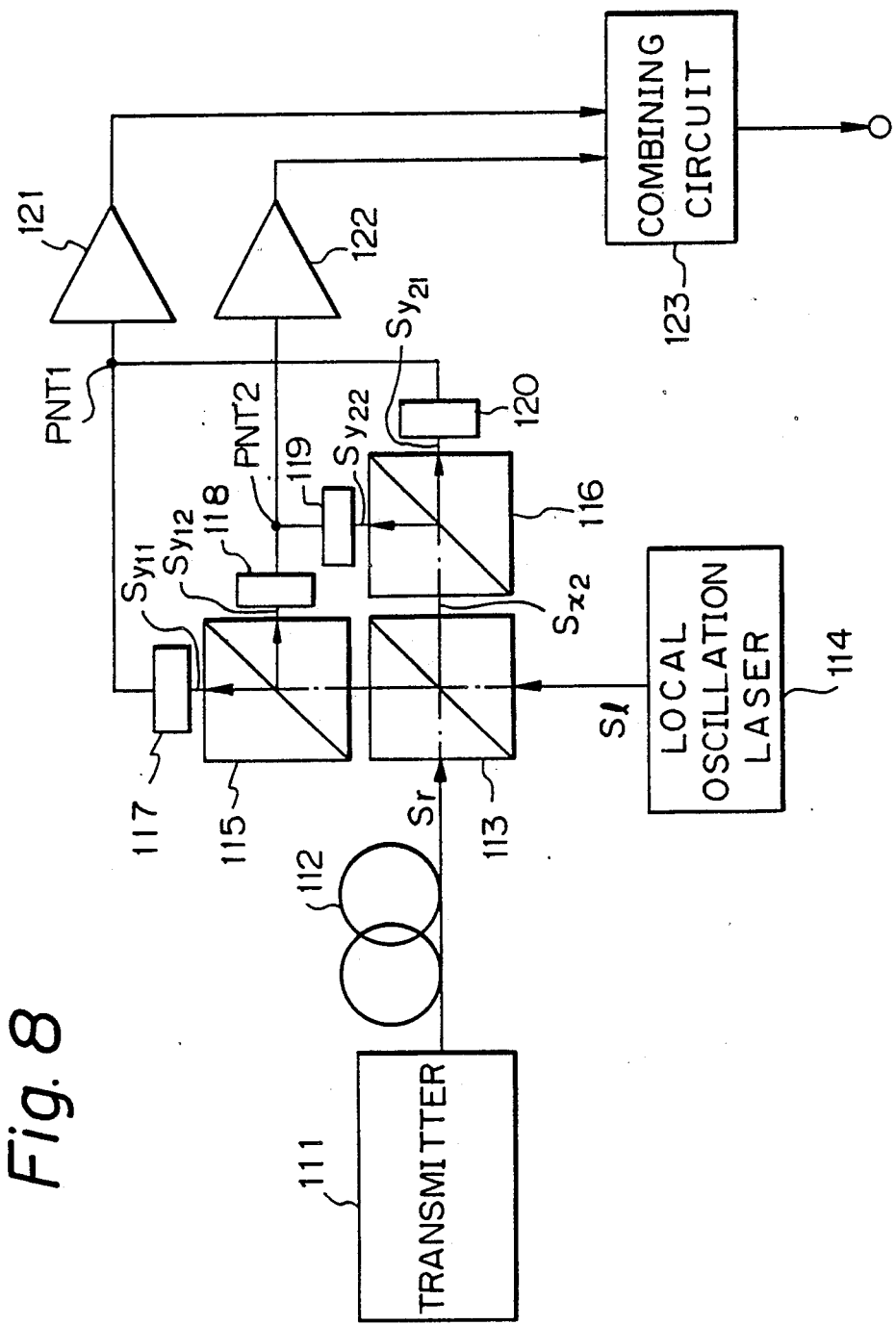
FIG. 8 is a schematic block diagram of a dual balanced optical signal receiver according to a first embodiment of the present invention.

FIG. 8 is a schematic block diagram of a dual balanced optical signal receiver according to a first embodiment of the present invention. In FIG. 8, the aforesaid optical mixing/polarization splitting means 101 (FIG. 7) is comprised of a photomixer 113 and polarizing prisms 115, 116. The optical signal receiving elements 117 and 120 correspond to the aforesaid optical signal receiving means 102 through 105 (FIG. 7). The aforesaid combining means 106 (FIG. 7) is comprised of amplifiers 121, 122 and a combining circuit 123.

The received optical signal $S_r$, given, via an optical transmission line 112, from an optical signal transmitter 111, is applied first to a mixing part, i.e., the photomixer 113, and mixed therein with a local oscillation optical signal $S_l$ from a local oscillation laser 114, so that two mixed optical signals $S_{x1}$, $S_{x2}$ are obtained, which are then projected onto respective polarizing prisms 115, 116 which form a polarization splitting part.

The optical signal receiving elements 117 and 120 are connected in series, as are the elements 118 and 119, as is shown in FIG. 5 or 6. The intermediate connecting points PNT1 and PNT2 therebetween, are led to respective amplifiers 121 and 122. Here, a subtracting means is formed by pairs of series connected elements 117, 120 and 118, 119 and the intermediate connecting points PNT1 and PNT2, followed by the combining means. The polarization splitting part, i.e., the polarizing prisms 115, 116, separate the mixed optical signals $S_{x1}$, $S_{x2}$ into two orthogonally polarized components to obtain, a total of four mixed and split optical signals $S_{y11}$, $S_{y12}$, $S_{y21}$, and $S_{y22}$. The signals $S_{y11}$ and $S_{y21}$, for example, S polarized wave signals, are projected onto the optical signal receiving elements 117 and 120, respectively, while the signals $S_{y12}$ and $S_{y22}$, for example, the P polarized wave signals, are projected onto the elements 118 and 119, respectively. In this case, the intensity noise components from the laser 114, contained in the signals $S_{y11}$ and $S_{y21}$, are in phase with each other and also the intensity noise components from the laser 114 contained in the signals $S_{y12}$ and $S_{y22}$ are in phase with each other. Accordingly, the S side intensity noise components are cancelled at point PNT1 by the series connected elements 117 and 120. Similarly, the P side intensity noise components are cancelled at point PNT2 by the series connected elements 118 and 119. Conversely, the beat signal components contained in the S side signals $S_{y11}$ and $S_{y21}$ are added together at point PNT1 and amplified by the amplifier 121. Similarly, the beat signal components contained in the P side signals $S_{y12}$ and $S_{y22}$ are added together at the point PNT2 and amplified by the amplifier 122. Note, it is not certain whether the signals $S_{y11}$ and $S_{y21}$ indicate the S polarized wave signals, as explained above, or the P polarized wave signals. This also holds true for the signals $S_{y12}$ and $S_{y22}$, as these two signals are complementary to the above two signals $S_{y11}$ and $S_{y21}$. The amplified signals from the amplifiers 121 and 122 are supplied to the combining circuit 123, in which the amplified signals are adjusted in phase relative to each other and then added together. The relative phase adjustment can be achieved by using, for example, the phase shifter 31 shown in FIG. 2, so that the added signal is maximized. Thus, a stable reception of the transmitted optical signal can be realized, since the P polarized wave signal and S polarized wave signal can be fully combined without any loss, even if there is a fluctuation of the polarization in the transmitted optical signal.

Figure 9:
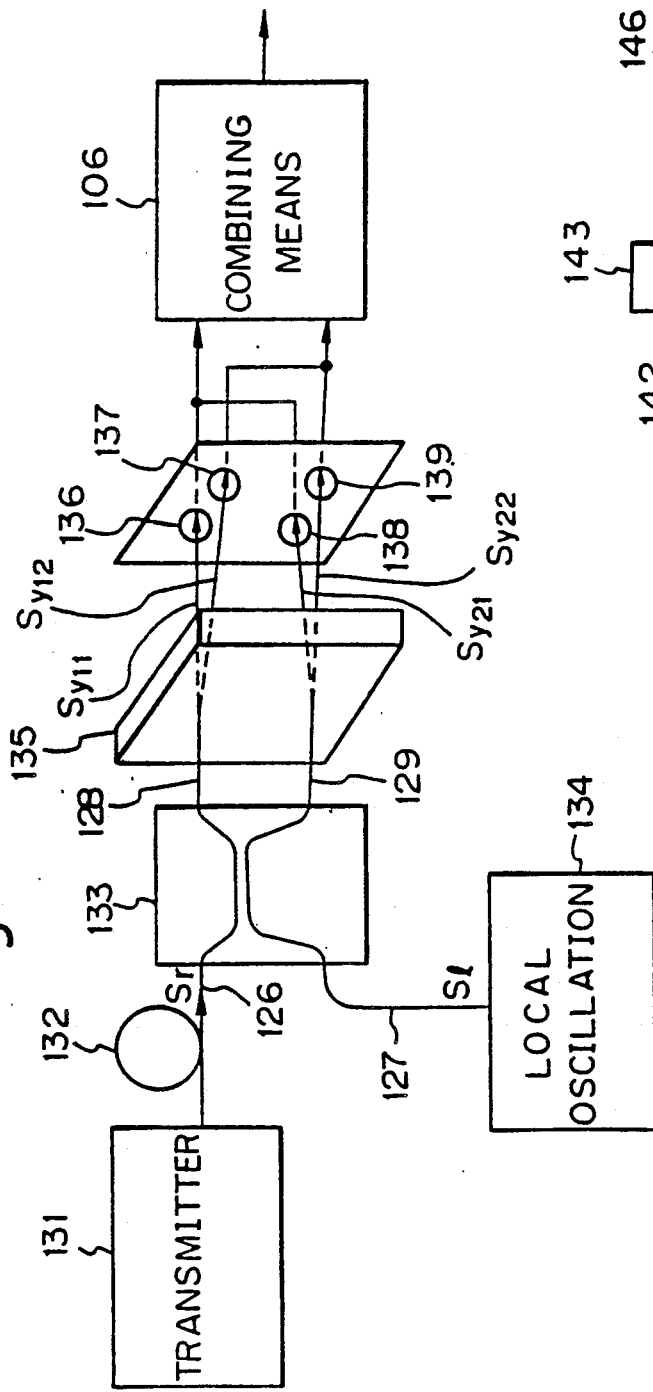
FIG. 9 illustrates a dual balanced optical signal receiver according to a second embodiment of the present invention.

FIG. 9 illustrates a dual balanced optical signal receiver according to a second embodiment of the present invention. In FIG. 9, the optical mixing/polarization splitting means 101 (FIG. 7) is comprised of a 3 dB photocoupler 133 as the mixing part and a polarization beam splitter 135 as the polarization splitting part. The optical signal receiving elements 136 through 139 correspond to the optical signal receiving means 102 through 105 (FIG. 7).

An optical transmission line 132 can be made of a single mode fiber as usual. However, other fibers 126 through 129, located in the vicinity of the input/output ports provided with the 3 dB photocoupler 133, are preferably made of polarization-maintaining fibers. Using a polarization maintaining fiber, the local oscillation optical signal $S_l$ from a local oscillation the first input port of the photocoupler 133 with a polarization plane rotated by 45° relative to the longitudinal axis of the fiber 127. This enables the same intensity of the local oscillation laser to be supplied for both the P polarized wave and the S polarized wave in the received optical signal $S_r$. On the other hand, although the transmitted optical signal from an optical signal transmitter 131 is given, through the line 132, with a random polarization direction, the received optical signal $S_r$ is supplied to the second input of the photocoupler 133 by way of the input fiber 126. Accordingly, a photomixing operation is performed in the photocoupler 133 and the thus mixed optical signals are then applied, via the polarization-maintaining fibers 128 and 129, to the polarization beam splitter 135, which is made of, for example, a crystal exhibiting a complex index of refraction, such as a calcite, to produce therefrom the split S and P polarized wave signals. As a result, the beam splitter 135 produces four mixed and split optical signals $S_{y11}$, $S_{y12}$, $S_{y21}$, and $S_{y22}$, as in FIG. 8. For example, the P polarized wave mixed and split optical signals $S_{y12}$ and $S_{y22}$ are sent to the optical signal receiving elements 137 and 139, while the S polarized wave mixed and split optical signals $S_{y11}$ and $S_{y21}$ are sent to the elements 136 and 138.

The optical signal receiving elements 136 and 138 are connected in series, as are the elements 137 and 139, and the IF electric signals appearing at the respective intermediate connecting points are processed in the combining means 106, as in FIG. 8. In the combining means 106, the IF output electric signal from the elements 36 and 38 and the IF output electric signal from the elements 37 and 39 are adjusted in phase to produce a maximized IF electric signal. In this case, the relative phase difference between the two IF output electric signals is caused by the difference in length of the fibers or jitter occurring in the fibers.

Figure 10:
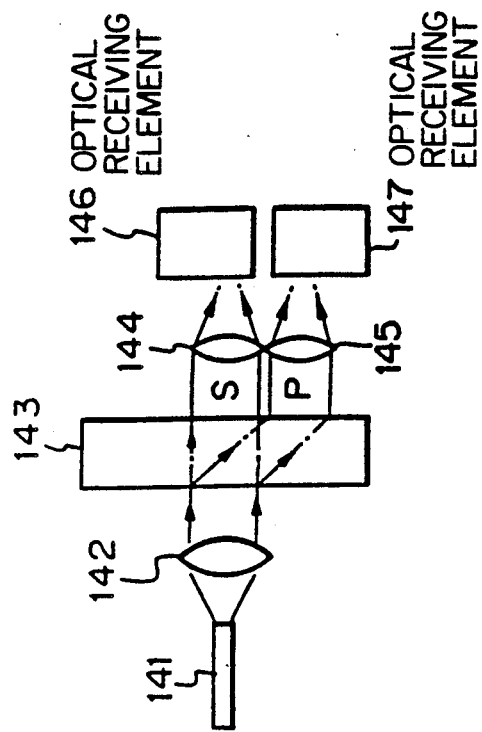
FIG. 10 is a view of the polarization splitting part used in FIG. 9.

FIG. 10 is a view of the polarization splitting part used in FIG. 9. The mixed optical output from a polarization-maintaining fiber 141 (corresponding to 128 or 129 in FIG. 9) is applied, via a suitable lens 142, to a polarization beam splitter 143 (corresponding to 135 in FIG. 9) and separated therein into both an S polarized wave signal and a P polarized wave signal. The S and P polarized wave signals are converged by respective lenses 144 and 145, and finally, sent to optical signal receiving elements 146 and 147 (corresponding to 136, 137 or 138, 139 in FIG. 10). In the above polarization splitting system, the lenses 144 and 145 may be omitted if a suitable focal length of the lens 142 is used.

The differences between the first embodiment (FIG. 8) and the second embodiment (FIG. 9) of the present invention are as follows. In the first embodiment, the optical system is relatively larger in size than the second embodiment, since two polarizing prisms 115 and 116 are employed in the first embodiment. Conversely, in the second embodiment, two mixed optical signals are split into two S polarized waves and two P polarized waves producing optical signals $S_{y11}$, $S_{y21}$, $S_{y12}$ and $S_{y22}$, by a single polarization splitting part, i.e., the splitter 135. This enables a reduction in size of the related optical system. In addition, the second embodiment is more advantageous than the first embodiment from the viewpoint of an easy matching of the polarization planes in the mixing part, i.e., the 3 dB photocoupler, due to the use of the polarization-maintaining fibers 126 through 129.

Figure 11:
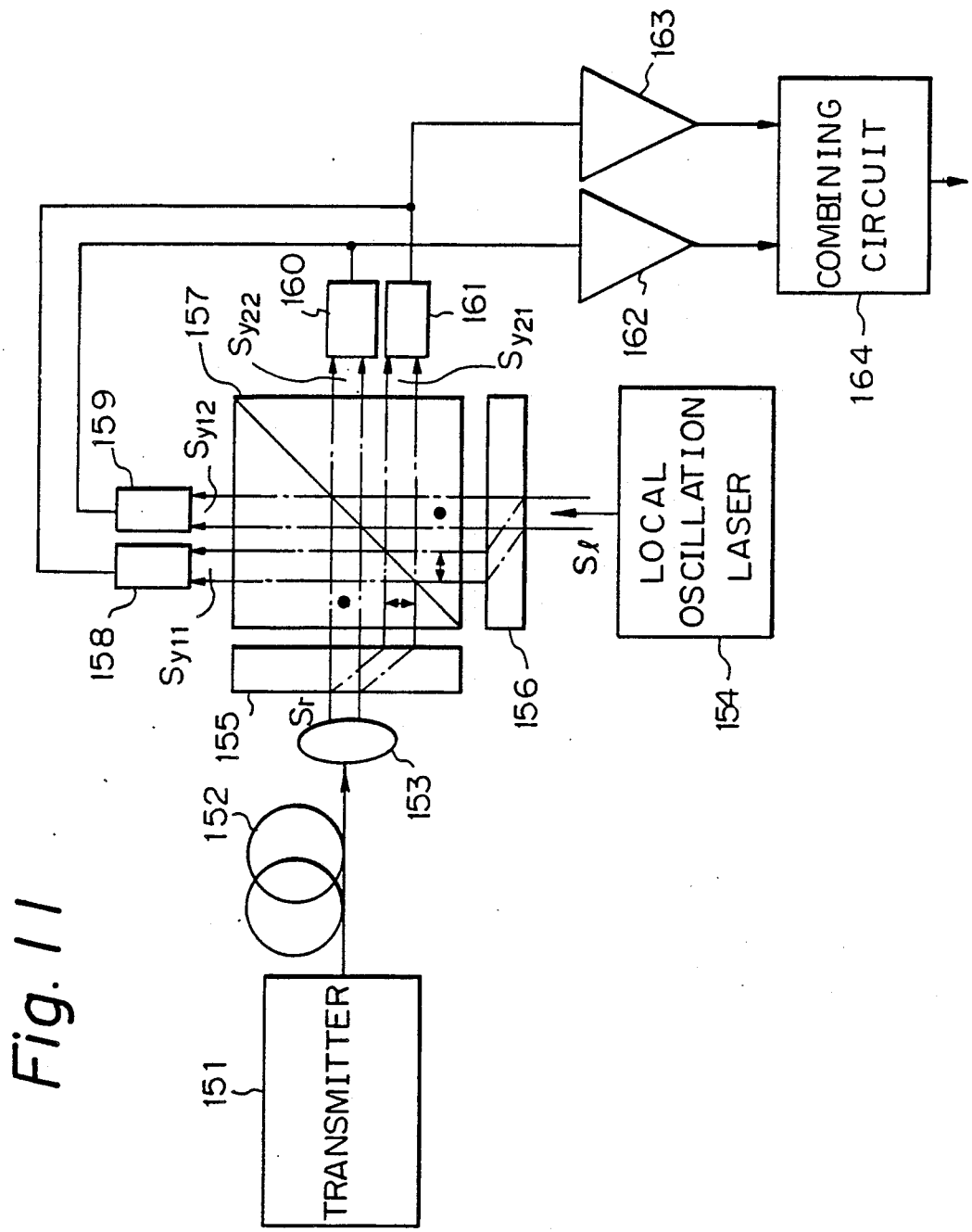
FIG. 11 is a schematic block diagram of a dual balanced optical signal receiver according to a third embodiment of the present invention.

FIG. 11 is a schematic block diagram of a dual balanced optical signal receiver according to a third embodiment of the present invention. In FIG. 11, reference numeral 154 denotes a local oscillation laser (corresponding to 114 in FIG. 8), 158 through 161 optical signal receiving elements (117 through 120 in FIG. 8), 162 and 163 amplifiers (121 and 122 in FIG. 8), and 164 a combining circuit (123 in FIG. 8). External to the optical receiver are arranged an optical signal transmitter 151 (111 in FIG. 8) and an optical transmission line 152 (112 in FIG. 8).

The aforesaid optical mixing/polarization splitting means 101 (FIG. 7) is comprised of the polarization splitting part and the mixing part in this order. Note, in the first and second embodiments, the mixing/polarization splitting means is comprised of the mixing part and the polarization splitting part in this order, in the direction of the transfer of the signal.

The received optical signal $S_r$, given, via the line 152 and a lens 153, from the transmitter 151, is applied first to the polarization splitting part, at a polarization splitting element 155, to separate it into an S polarized wave received signal and a P polarized wave received signal. At the same time, the local oscillation optical signal $S_l$ is applied first to the polarization splitting part, at a polarization splitting element 156, to separate it into an S polarized wave local signal and a P polarized wave local signal with the same intensity for each polarization. Then the above mentioned signals are mixed with each other in the mixing part, i.e., a photomixer 157, so that four split and mixed optical signals $S_{y11}$, $S_{y12}$, $S_{y21}$, $S_{y22}$ are produced and projected onto respective optical signal receiving elements 158 through 161. The elements 159 and 160 are supplied with optical signals having the same polarized component, such as P (or S), and the elements 158 and 161 are supplied with optical signals having the same polarized component, such as S (or P). In this case, the intensity noise of the local oscillation optical signal $S_l$, given to the optical signal receiving element 159, and the intensity noise given to the element 160 have the same phase, i.e., are in phase. Also, the intensity noise of the local oscillation optical signal $S_l$, given to the optical signal receiving element 158 and the intensity noise given to the element 161 have the same phase, i.e., are in phase. Accordingly, the intensity noise components are cancelled, on one hand, by the series connected elements 159 and 160, and on the other hand, by the series connected elements 158 and 161. Conversely, one set of polarization beat signal components is added by the series connected elements 158 and 161, and another set of polarization beat signal components is added by the series connected elements 159 and 160. The thus emphasized beat signal components are further amplified by respective amplifiers 162 and 163 and then adjusted to be in phase with each other to produce, when combined, a maximum IF output signal, from the combining circuit 164.

Figure 12:
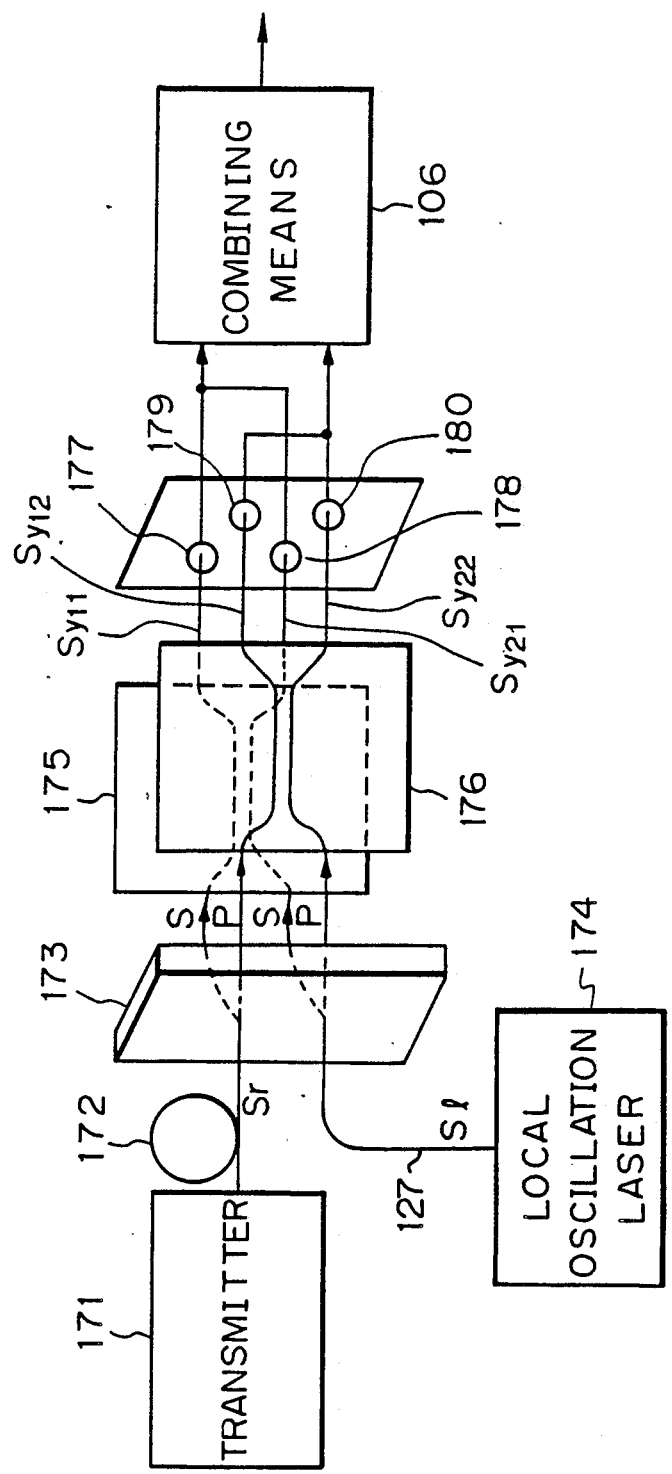
FIG. 12 illustrates a dual balanced optical signal receiver according to a fourth embodiment of the present invention.

FIG. 12 illustrates a dual balanced optical signal receiver according to a fourth embodiment of the present invention. In FIG. 12, the optical mixing/polarization splitting means 101 (FIG. 7) is comprised of a polarization beam splitter 173 as the polarization splitting part and 3 dB photocouplers 175 and 176 as the mixing part. The optical signal receiving elements 177 through 180 correspond to the optical signal receiving means 102 through 105 (FIG. 7).

An optical transmission line 179 can be made of a single mode fiber, as usual, and a local fiber 127 can be made of a polarization maintaining fiber. A transmitted optical signal from an optical signal transmitter 171 is applied, via an optical transmission line 172, to the polarization beam splitter 173, as an optical received signal $S_r$. At the same time, a local oscillation optical signal $S_l$ is applied from a local oscillation laser 174 with a polarization plane rotated by 45° relative to the principal axis of the polarizing beam splitter 173. The local oscillation optical signal $S_l$ is separated into two independent polarized wave signals (P, S) having the same intensity. In the splitter 173, the signal $S_r$ is separated into an S polarized wave signal and a P polarized wave signal, as is the signal $S_l$. These S and P polarized wave split signals are mixed in the 3 dB photocouplers 175 and 176 to produce four split and mixed optical signals $S_{y11}$, $S_{y12}$, $S_{y21}$, and $S_{y22}$ which are then sent to the respective optical signal receiving elements 177 through 180. For example, the S polarized wave component signals are given to the elements 177 and 178, while the P polarized wave component signals are given to the elements 179 and 180. Since the elements 177 and 178 are connected in series, as are the elements 179 and 180, the intensity noise contained in the local signal $S_l$ is cancelled, while effectively maintaining the polarization diversity, and finally, after adjustment of the phases, the combining means 106 produces the maximum IF output signal, as previously explained.

The difference between the third embodiment (FIG. 11) and the fourth embodiment (FIG. 12) resides in that, in the third embodiment, since the related optical system is set up with the use of spatial optical beams, it is necessary to effect a very fine adjustment of the wave planes appearing in the system. Conversely, in the fourth embodiment, the wave plane matching is easily performed due to the employment of the optical waveguide mixers.

Figure 13:
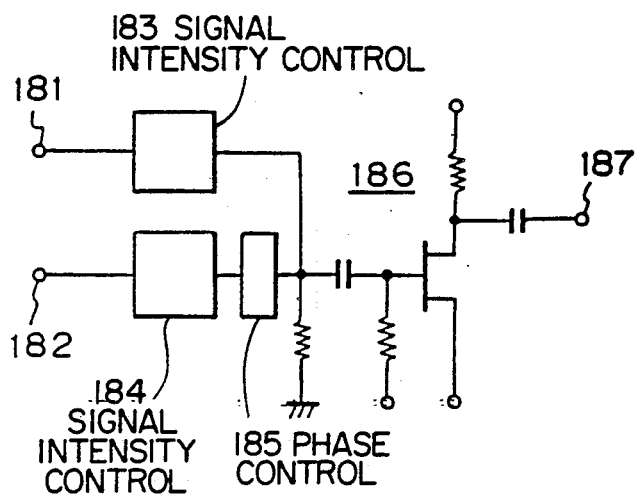
FIG. 13 is a circuit diagram of a combining circuit according to a first example of the present invention.

FIG. 13 is a circuit diagram of a combining circuit according to a first example of the present invention. Each of the aforesaid combining circuits in the combining means 106 can be constructed with the circuit arrangement of FIG. 13. Referring to FIG. 13 and, for example, FIG. 8 (first embodiment), input terminals 181 and 182 are respectively connected to the amplifiers 121 and 122 and the output terminal 187 produces the IF output signal. A phase control means is employed in the combining circuit, which means is realized as a delay line 185 for a phase adjustment (similar to the phase shifter 31 in FIG. 2). Further the combining circuit employs therein a signal intensity control means which is realized as level weighting circuits 183 and 184. Furthermore, the combining circuit employs therein a summing means which is realized as a single stage amplifying transistor 186 having a common gate to the signal paths led to the input terminals 181 and 182.

Figure 14:
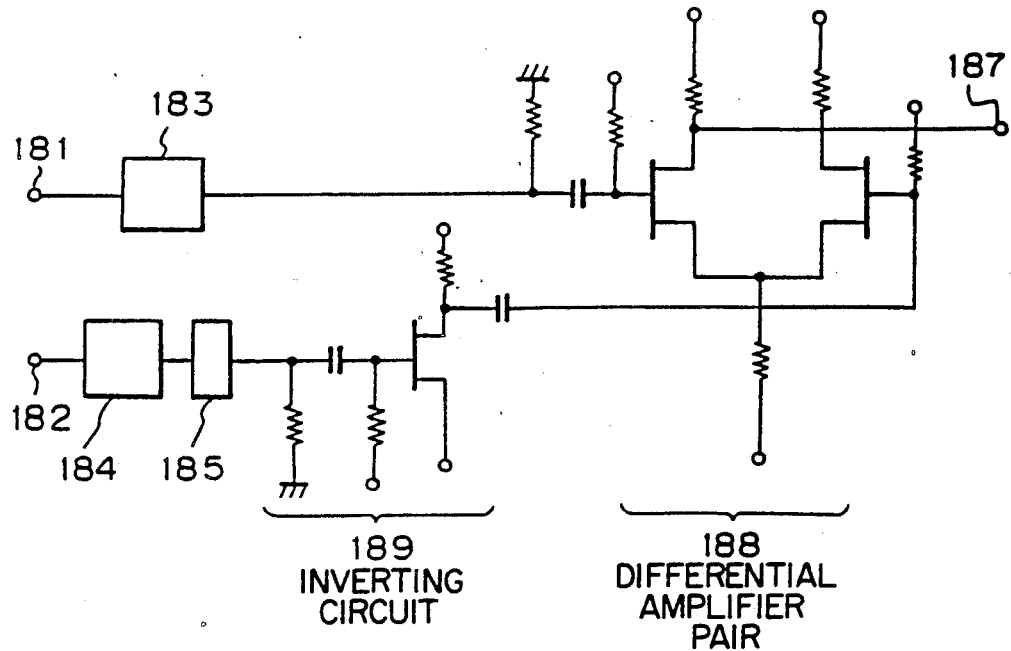
FIG. 14 is a circuit diagram of a combining circuit according to a second example of the present invention.

FIG. 14 is a circuit diagram of a combining circuit according to a second example of the present invention. This second example comprises a slight modification of the first example (FIG. 13). That is, the summing means is realized not by the aforesaid single stage amplifying transistor (refer to 186 in FIG. 13), but by a differential amplifying transistor pair 188. In this case, an inverting circuit 189 must be provided for one of the differential transistors.

Figure 15:
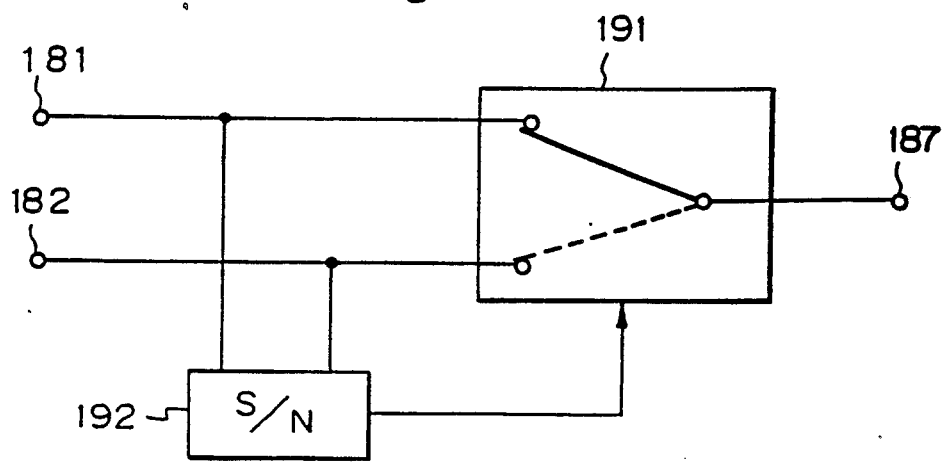
FIG. 15 is a block diagram of a combining circuit according to a third example of the present invention.

FIG. 15 is a block diagram of a combining circuit according to a third example of the present invention. The third example utilizes a switching circuit 191 which selects one of the IF electric signals supplied to the input terminals 181 and 182 and having a better S/N value than that of the other signal. To this end, an S/N detector 192 cooperates with the switching circuit 191 for the related selection.

As explained above, the dual balanced optical receiver can attain a stable optical signal reception. In this case, the stability must be maintained over a wide frequency range. Particularly, the stability in terms of the intensity noise should be taken into consideration.

Figure 16:
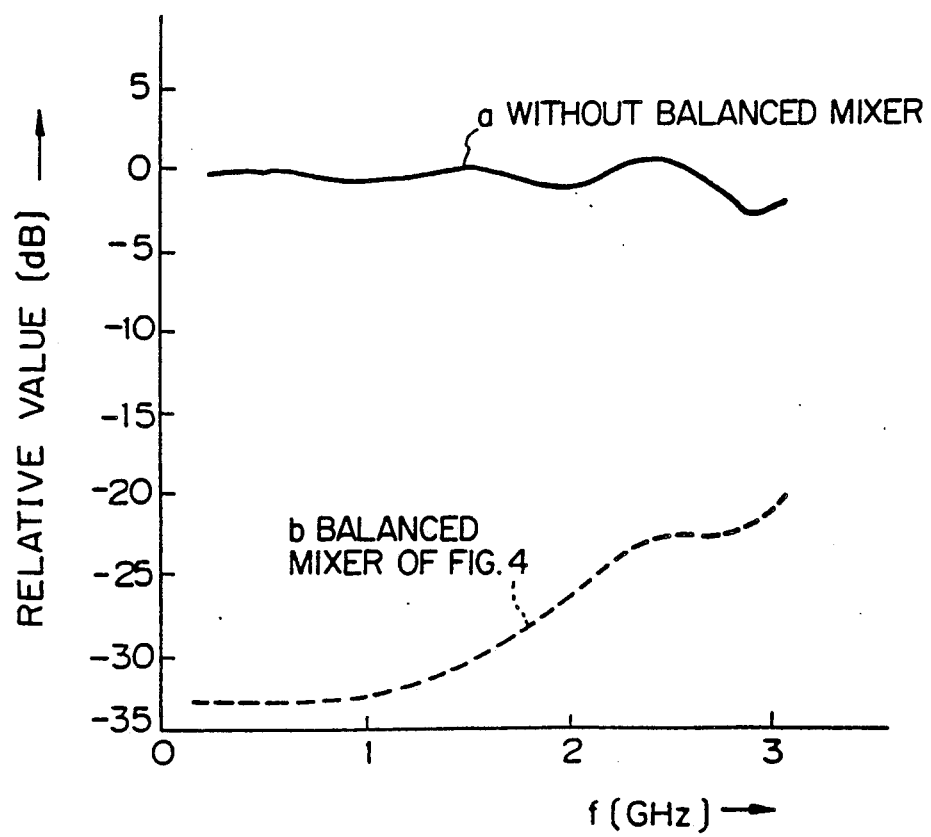
FIG. 16 is a graph of intensity noise suppression characteristics.

FIG. 16 depicts a graph showing intensity noise suppression characteristics. In the graph, the ordinate indicates a relative value in dB of the intensity noise, while the abscissa indicates a frequency of the IF electric signal. The solid line characteristic curve "a" denotes values obtained when a balanced-mixer receiver is not provided, i.e., the receiver shown in FIG. 2, and the broken line characteristic curve "b" denotes values when the balanced-mixer receiver shown in FIG. 4 is provided. As is apparent, the intensity noise can be greatly suppressed in the latter case, particularly in the frequency range lower than 1 GHz. However, the intensity noise suppression capability is gradually lost in the frequency range higher than 1 GHz. In practice, the frequency of the IF electric signal is determined on the order of several GHz. This means that, in the previously mentioned dual balanced optical signal receiver, there is still room for an improvement of the intensity noise of the local oscillation optical signal $S_l$.

Figure 17:
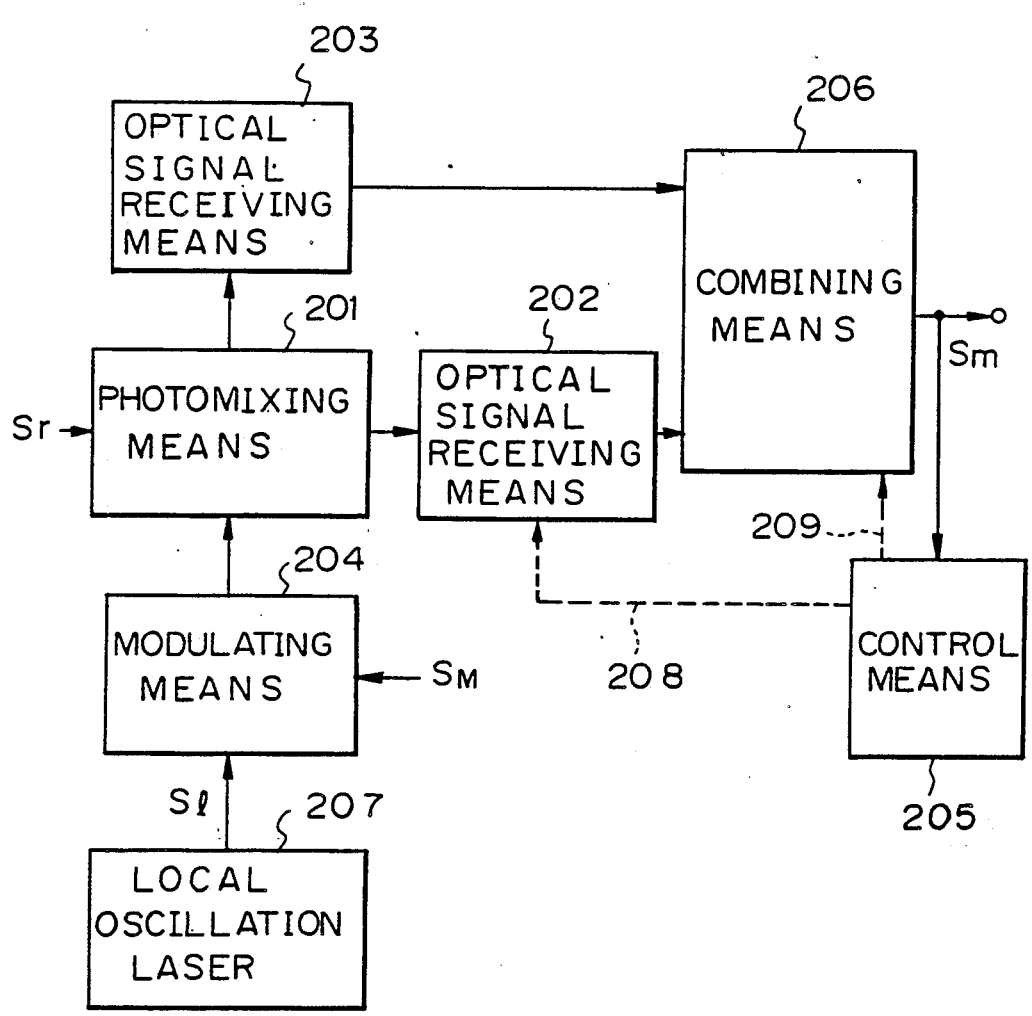
FIG. 17 is a principal block diagram of an intensity noise suppression arrangement.

FIG. 17 is a principal block diagram of a intensity noise suppression arrangement. The arrangement is preferably introduced in each of the optical receivers mentioned previously with reference to FIGS. 8, 9, 11 and 12. The concept of suppressing the intensity noise can be understood from FIG. 17. The intensity noise suppressor is characterized by a modulation means 204, a control means 205, and control lines 208 and 209. The modulation means 204 modulates the local signal $S_l$ with a modulation signal $S_M$, and the control means 205 first supervises the related modulation signal component $S_m$ superposed on the IF output signal produced from the combining means 206 and then minimizes the component $S_m$ by way of the control line 208 and/or the control line 209.

Other elements cooperating with the intensity noise suppressor (204, 205, 208, 209) are substantially identical to the analogous members explained hereinbefore. That is the photomixing means mixes the received optical signal $S_r$ with the local oscillation optical signal $S_l$ and produces two optical signals in two ways, each having an intermediate frequency (IF). The optical signal receiving means 202, 203 receives the respective IF optical signals and transform them into two corresponding electric signals of an intermediate frequency (IF). The combining means 206 produces the IF output signal by subtracting two IF electric signals from each other, and the modulation means 204, as mentioned before, modulates the signal $S_l$ with the modulation signal $S_M$. The control means 205 extracts the modulation signal component $S_m$ from the IF output signal and controls the optical signal receiving means 202 (or 203) and/or the combining means 206 to ensure that the level of the thus extracted modulation signal component $S_m$ is minimized, as mentioned before, via the control lines 208 and/or 209.

It is considered that a degradation of the intensity noise suppression is induced by at least one of the following factors; first, an inbalance of the frequency characteristics between the optical signal receiving elements 202 and 203, and second, an inbalance of the amplifiers (not shown but identical to the amplifiers illustrated, for example, as 121 and 122, in FIG. 8) used in the combining means 206. If the above-mentioned inbalance is not present, the modulation signal component $S_m$ is cancelled. In practice, the modulation signal component, however, will more or less remain. If, the thus remaining modulation signal component is cancelled, the intensity noise contained in the IF output signal is also cancelled. This cancellation can be achieved by compensating the difference in characteristics between the optical signal receiving means 202 and 203, and/or by compensating the difference in gain or delay time between the aforesaid amplifiers (similar to 121 and 122).

Figure 18:
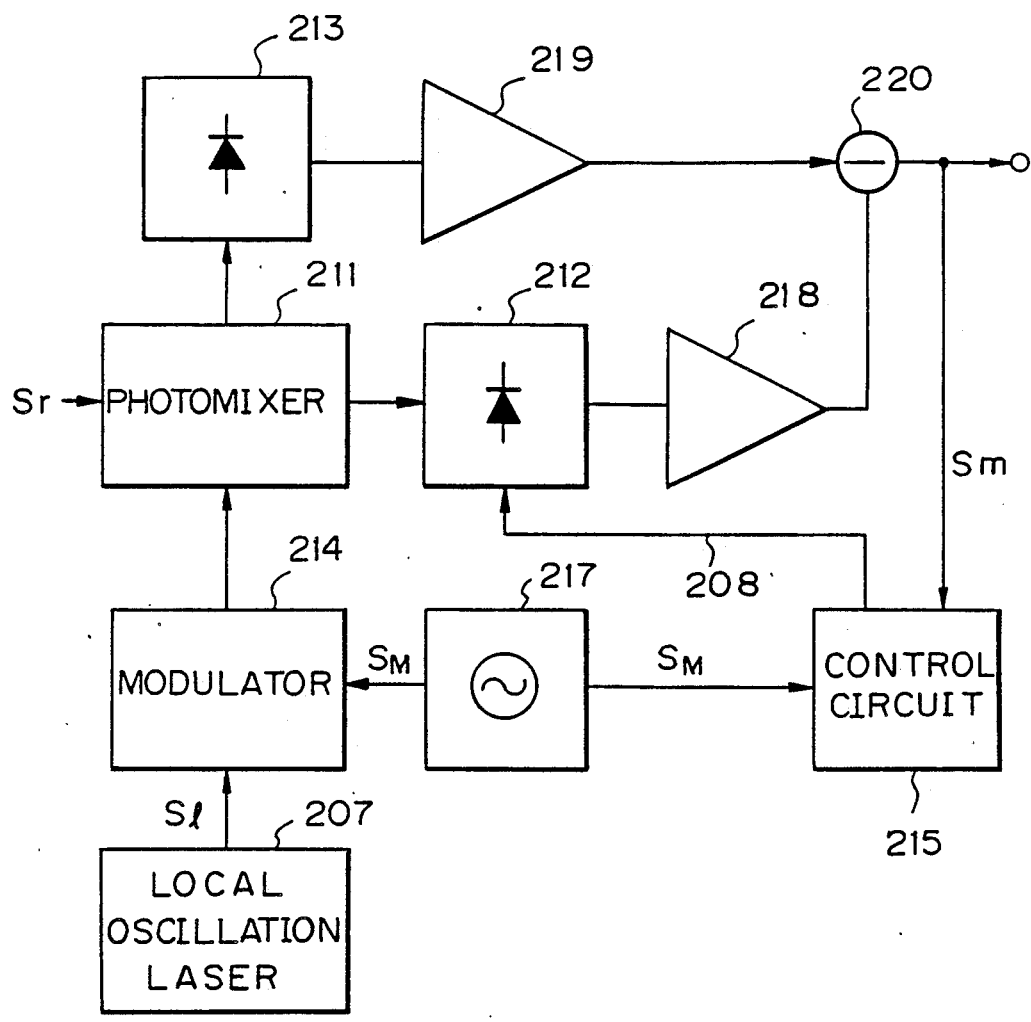
FIG. 18 is a schematic block diagram of a first type of intensity noise suppressor.

FIG. 18 is a schematic block diagram of a first type of an intensity noise suppressor. The modulating means 204 of FIG. 17 is comprised of a usual modulator 214 which receives the modulation signal $S_m$ given from an oscillator 217. The modulation signal $S_m$ is also given to a control circuit 215 (corresponding to 205 of FIG. 17). The control circuit 215 is comprised of a lock-in amplifier. The lock-in amplifier carries out a synchronous detection of the modulation signal component $S_m$ with the signal $S_M$ having, for example, a sine wave, so that only the modulation signal component $S_m$ is produced therefrom. The control circuit 215 carries out a gain control, via the line 208, with respect to a photodiode 212 (corresponding to 202 in FIG. 17) to adjust the output level thereof, in accordance with the variation of the $S_m$.

A photomixer 211 (corresponding to 201 in FIG. 17) produces two mixed optical signals, one of which is applied to a photodiode 213 (corresponding to 203 in FIG. 17) and the other to the photodiode 212. Then the corresponding IF electric signals, after amplification by amplifiers 218 and 219, are subtracted from each other by a subtractor 220 to produce the IF output signal which contains the modulation signal component $S_m$, if present.

Figure 19:
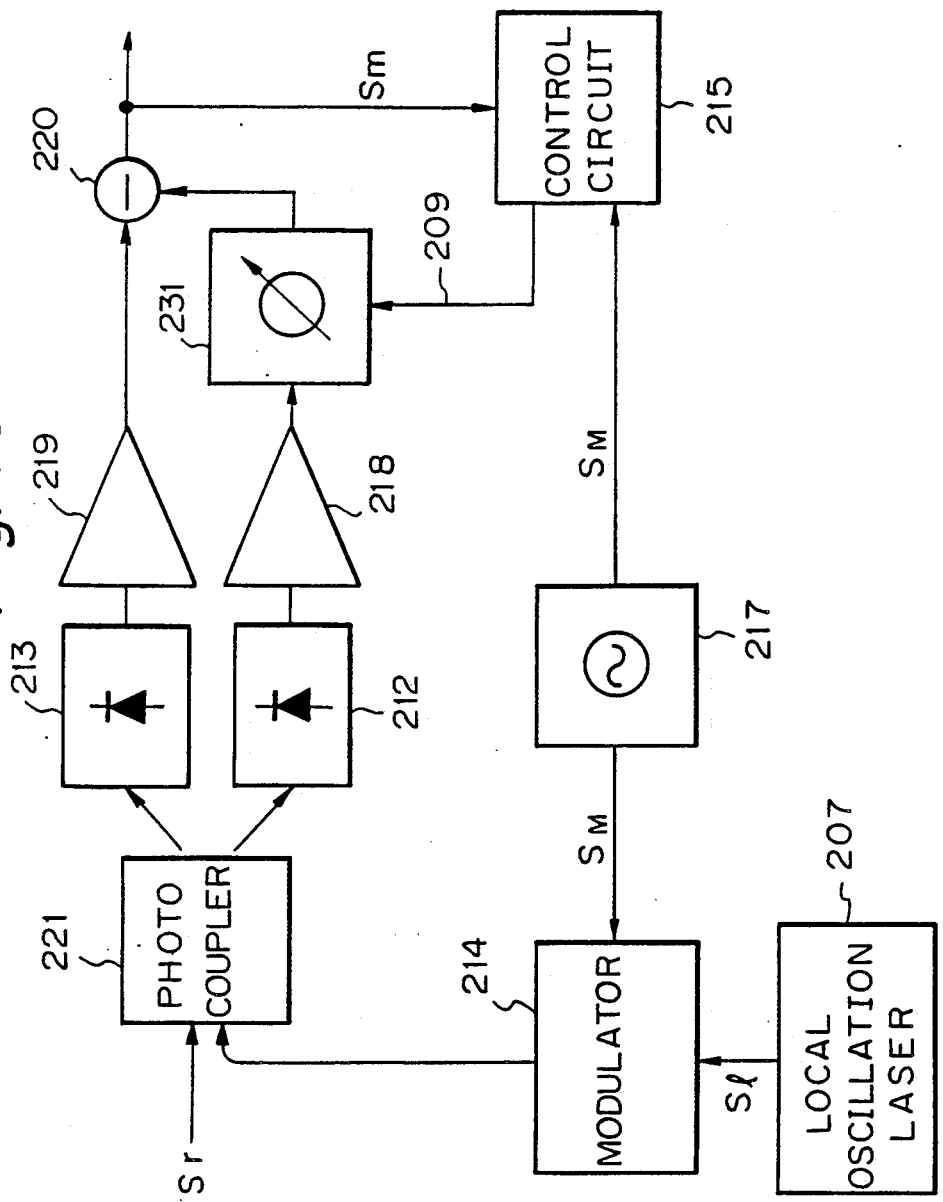
FIG. 19 is a schematic block diagram of a second type of intensity noise suppressor.

FIG. 19 is a schematic block diagram of a second type of intensity noise suppressor. Members identical to those of FIGS. 17 and 18 are represented by the same reference numerals or symbols, which also applies to later figures. In FIG. 19, the control circuit 215 controls, via the line 209, a phase shifter 231. The phase shifter 231 adjusts the phase difference between the IF electric signals given from the amplifiers 218 and 219 in accordance with the variation of the $S_m$. In the figure, a 3 dB photocoupler 221 is illustrated as the photomixing means 201 of FIG. 17.

Figure 20:
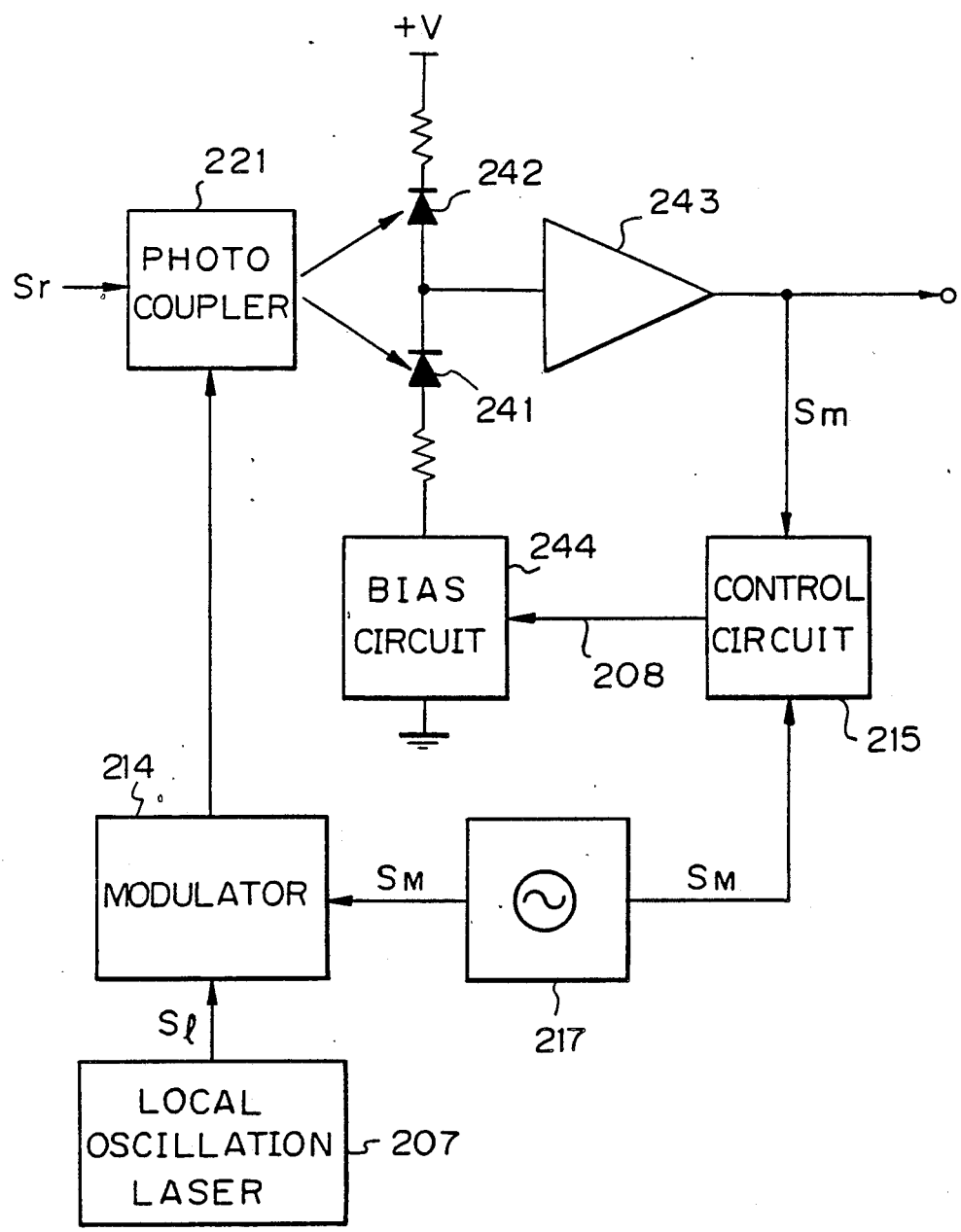
FIG. 20 is a schematic block diagram of a third type of intensity noise suppressor.

FIG. 20 is a schematic block diagram of a third type of an intensity noise suppressor. The control circuit 215 controls a bias circuit 244 for biasing series connected photodiodes 241 and 242 to adjust the output level of the series connection photodiodes, which provides the function, together with a single amplifier 243, of the subtractor 220 in FIG. 18 or FIG. 19.

Figure 21:
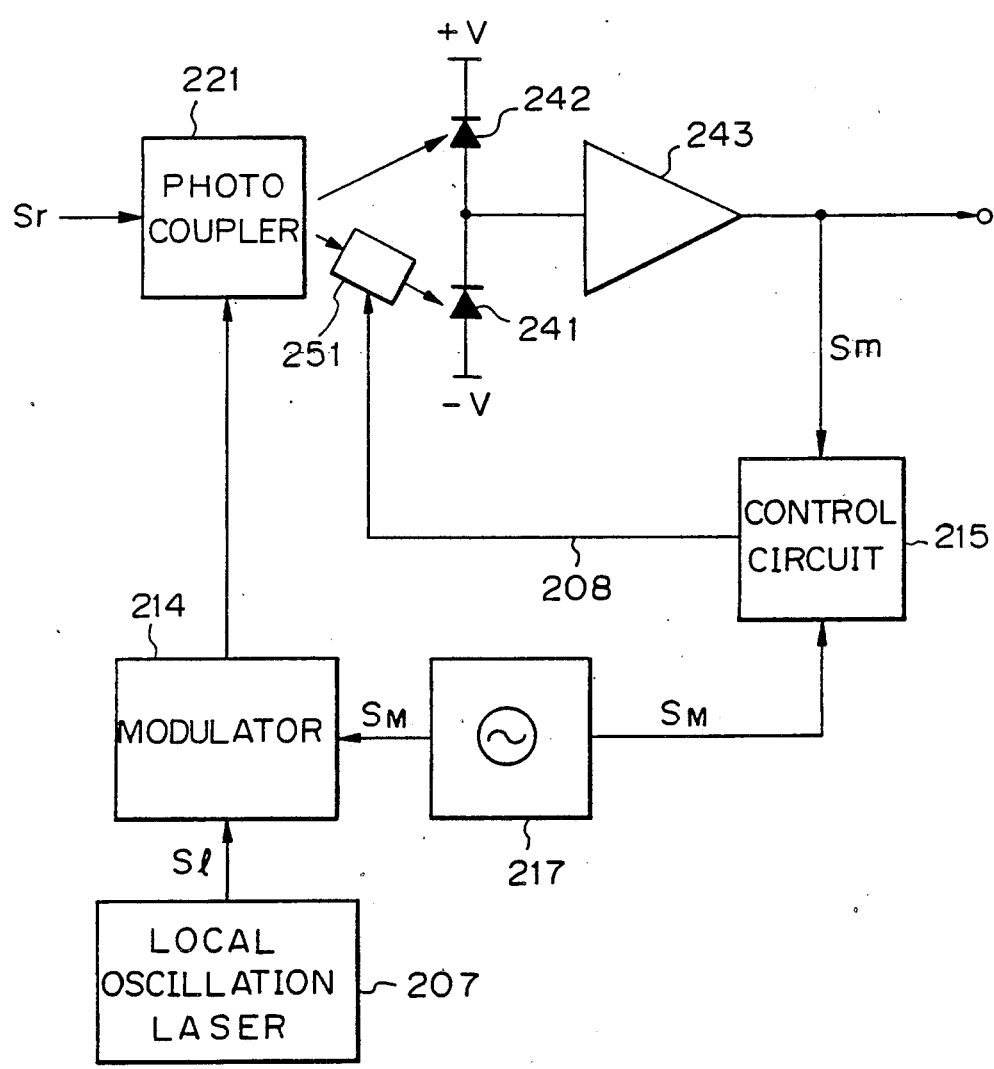
FIG. 21 is a schematic block diagram of a fourth type of intensity noise suppressor.

FIG. 21 is a schematic block diagram of a fourth type of intensity noise suppressor. The control circuit 215 controls an optoelectric device 251. The optoelectric device 251 varies an optical intensity and/or a lightwave phase of the IF optical signal to be applied to the photodiode 241 in accordance with the variation of the component $S_m$. The optoelectric device 251 is made of, for example, a Pockels effect device.

FIGS. 17 through 21 show the intensity noise suppressors effective at frequencies higher than several GHz, each of which is basically joined with a prior art balanced-mixer receiver of FIG. 4. These Figures are intended to facilitate an understanding of the intensity noise suppressor according to the present invention, i.e., the modulator and the control circuit for suppressing the modulation signal component $S_m$, that is, the suppression of the intensity noise, and finally, the intensity noise suppressor is joined with a dual balanced optical signal receiver of FIG. 7 according to the present invention.

Figure 22:
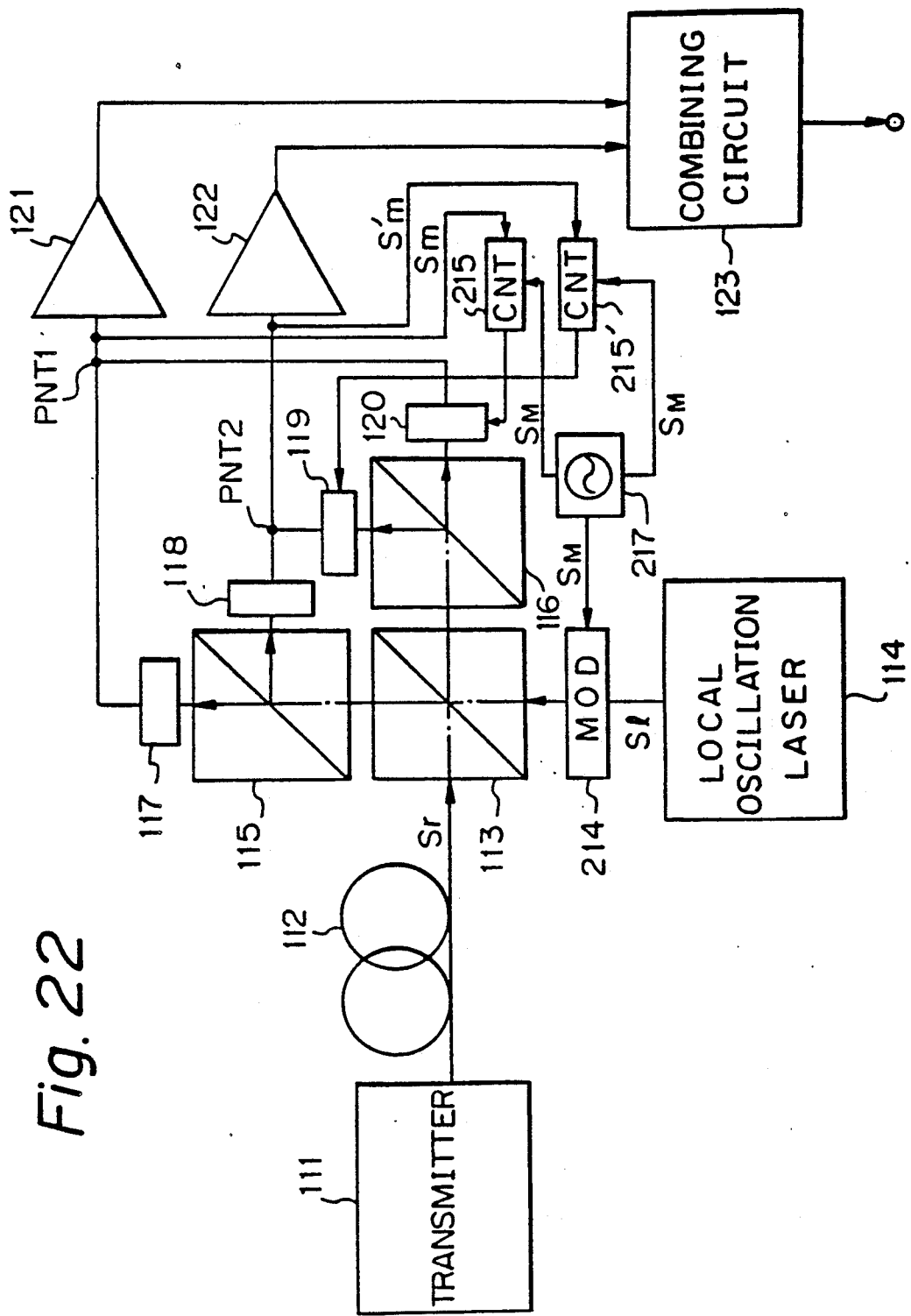
FIG. 22 is a schematic block diagram of a dual balanced optical signal receiver provided with an intensity noise suppressor.

FIG. 22 is a schematic block diagram of a dual balanced optical signal receiver joined with an intensity noise suppressor. It should be understood that although the intensity noise suppressor in FIG. 22 is joined with the dual balanced optical signal receiver according to the first embodiment of FIG. 8, the intensity noise suppressor also can be applied to the embodiments shown in FIG. 9, 11, or 12. Further, in FIG. 22, the first type of intensity noise suppressor (FIG. 18) is employed. In this case, two identical control circuits (CNT) 215 and 215' are provided for one polarization side and the other polarization side, but commonly receive the modulation signal $S_M$ from the oscillator 217. The signal $S_M$ is also applied to the modulator (MOD) 214. The control circuits 215 and 215' supervise the respective modulation signal components $S_m$ and $S'_m$ appearing at the points PNT1 and PNT2 (each corresponding to the output terminal of the subtractor 220 in FIG. 18), respectively, so that the output levels of the optical signal receiving elements 119 and 120 are made equal to the output levels of the elements 117 and 118, respectively.

As mentioned above, in detail, the dual balanced optical signal receiver according to the present invention is advantageous in that the C/N can be improved even when a semiconductor laser and the like with an accompanying high intensity noise is used; a stable coherent lightwave communication can be realized regardless of fluctuations of the polarization, and an increase in the intensity noise at the higher frequency range can be suppressed even if variances in characteristics of the electric components become large due to, for example, temperature variations or long term use.

We claim:

1. A dual balanced optical signal receiver, comprising:
    optical mixing means for mixing a received optical signal with a local oscillation optical signal and producing a plurality of IF optical signals having an intermediate frequency;
    polarization splitting means for splitting each of the IF optical signals into first IF optical signals and second IF optical signals orthogonally polarized with respect to each other;
    optical signal receiving means for receiving the first IF optical signals and the second IF optical signals and outputting first IF electric signals and second IF electric signals, respectively corresponding to the first and second IF optical signals; and combining means for combining each of the first IF electric signals and outputting a first signal output, and combining each of the second IF electric signals and outputting a second signal output.

2. A receiver as set forth in claim 1, wherein said combining means comprises a switching circuit for selecting and providing one of the first and second signal outputs in accordance with a signal to noise ratio.

3. A receiver as set forth in claim 1, wherein said optical mixing means produces two IF optical signals and said splitting means produces two first IF optical signals and two second IF optical signals.

4. A receiver as set forth in claim 3, wherein said optical mixing means comprises adjusting means for adjusting a polarization direction of the local oscillation optical signal and adjusting the orthogonally polarized components to have substantially a same intensity as each other.

5. A receiver as set forth in claim 4, wherein said adjusting means comprises:
 a polarization-maintaining optical fiber connected to said optical mixing means, for providing the local oscillation optical signal to said optical mixing means and rotating a polarization plane of the local oscillation optical signal relative to a longitudinal axis of said fiber by an angle of 45°.

6. A receiver as set forth in claim 1, wherein said combining means comprises:
 phase control means for matching phases of the first and second signal outputs; and
 summing means for summing the phase-matched first and second signal outputs.

7. A receiver as set forth in claim 1, further comprising:
 modulation means for modulating the local oscillation optical signal and providing the modulated local oscillation optical signal to said optical mixing means; and
 control means for extracting a modulation signal component from one of the first and second signal outputs from said combining means and controlling said optical signal receiving means to minimize a level of the extracted modulation signal component.

8. A dual balanced optical signal receiver, comprising:
 optical mixing/polarization splitting means for receiving an optical signal, a local oscillation optical signal and producing IF optical signals having an intermediate frequency by mixing the received optical signal with the local oscillation optical signal and then splitting the resultant mixed signal into orthogonally polarized components having a first and second type of polarization, said optical mixing/polarization splitting means comprising:
  a mixing part mixing the received optical signal with the local oscillation optical signal and producing mixed optical signals; and
  a polarization splitting part connected to said mixing part, separating the mixed optical signals into the orthogonally polarized components and producing a total of four pairs of mixed and split optical signals;
 optical signal receiving means for receiving the IF optical signals and transforming the IF optical signals into corresponding IF electric signals having the intermediate frequency, said optical signal receiving means comprising four optical signal receiving elements connected to receive the pairs of mixed and split optical signals from said polarization splitting part and transforming the pairs of mixed and split optical signals into the corresponding IF electric signals; and
 combining means for receiving the IF electric signals and producing a first signal output by combining the IF electric signals corresponding to the IF optical signals having the first type of polarization and a second signal output by combining the IF electric signals corresponding to the IF optical signals.

9. A receiver as set forth in claim 8, wherein said combining means comprises polarization combination means for receiving the corresponding IF electric signals from said four optical signal receiving elements and producing two signal outputs by combining two IF electric signals having the firs type of polarization with each other, and combining two IF electric signals having the second type of polarization with each other.

10. A receiver as set forth in claim 4, wherein said combining means further comprises a switching circuit connected to said polarization combination means, selecting and providing one of the two signal outputs in accordance with a signal to noise ratio.

11. A receiver as set forth in claim 9, wherein said combining means further comprises:
 phase control means for matching phases of the two signal outputs; and
 summing means for summing the phase-matched signal outputs.

12. A receiver as set forth in claim 11, wherein said combining means further comprises signal intensity control means for equalizing an intensity of each of the two signal outputs and applying the equalized IF electric signals to said phase control means.

13. A dual balanced optical signal receiver, comprising:
 optical mixing polarization splitting means for receiving an optical signal, a local oscillation optical signal and producing IF optical signals having an intermediate frequency by splitting the received optical signal into orthogonally polarized components have a first and second type of polarization and then mixing each of the orthogonally polarized components with the local oscillation optical signal, said optical mixing polarization splitting means comprising:
  a polarization splitting part receiving and separating each of the received optical signal and the local oscillation optical signal into two orthogonally polarized components having the first and second type of polarization; and
  a mixing part connected to said polarization splitting part, mixing and providing the polarized components having the first type of polarization, mixing and providing the polarized components having the second type of polarization and providing mixed and split optical signals as the IF optical signals;
 optical signal receiving means for receiving the IF optical signals and transforming the IF optical signals into corresponding IF electric signals having the intermediate frequency, said optical signal receiving means comprising optical signal receiving elements connected to said optical mixing polarization splitting means, transforming the mixed and split optical signals from said mixing part into corresponding IF electric signals; and combining means for receiving the IF electric signals and producing a first signal output by combining the IF electric signals corresponding to the IF optical signals having the first type of polarization and a second signal output by combining the IF electric signals corresponding to the IF optical signals having the second type of polarization.

14. A receiver as set forth in claim 13, wherein said combining means further comprises a switching circuit connected to said polarization combining means, selecting and providing one of the first signal output and the second signal output in accordance with a signal to noise ratio.

15. A receiver as set forth in claim 13, wherein said combining means further comprises:
phase control means for matching phases between the first signal output and the second signal output; and
summing means for summing the phase-matched first and second signal outputs.

16. A receiver as set forth in claim 15, wherein said combining means further comprises signal intensity control means for equalizing an intensity of the two independent IF electric signals and applying the equalized intensity independent IF electric signals to said phase control means.

17. A dual balanced optical signal receiver, comprising:
photomixing means for mixing a received optical signal with a local oscillation optical signal and producing two IF optical signals each having an intermediate frequency;
optical signal receiving means for receiving said IF optical signals and transforming said IF optical signals into two corresponding IF electric signals having an intermediate frequency;
combining means for producing an output signal by subtracting each of the two IF electric signals form each other;
modulation means for modulating the local oscillation optical signal received by said photomixing means; and
control means for extracting a modulation signal component from the output signal of said combining means and controlling said optical signal receiving means to minimize a level of the extracted modulation signal components.

18. A receiver as set forth in claim 17, wherein said control means comprises means for controlling an output level of said optical signal receiving means.

19. A receiver as set forth in claim 17, wherein said control means comprises means for controlling a phase of each of the IF electric signals.

20. A dual balanced optical signal receiver, comprising:
polarization splitting means for splitting a received optical signal and a local oscillation optical signal into orthogonally polarized first and second optical signals, respectively;
optical mixing means for mixing each of the first optical signals and mixing each of the second optical signals and producing a plurality of IF optical signals having an intermediate frequency;
optical signal receiving means for receiving each of the IF optical signals and outputting a plurality of IF electric signals corresponding to each of the IF optical signals; and
combining means for combining each of the IF electric signals corresponding to the first optical signals and outputting a first signal output, and combining each of the IF electric signals corresponding to the second optical signals and outputting a second signal output.

21. A dual balanced optical signal receiver as set forth in claim 20, wherein said polarization splitting means produces two first optical signals and two second optical from the two first optical signals and the two second optical signals.

22. A dual balanced optical signal receiver as set forth in claim 20, further comprising:
modulation means for modulating the local oscillation optical signal and providing the modulated local oscillation optical signal to said polarization splitting means; and
control means for extracting the modulation signal component from the first and second signal outputs from said combining means and controlling said optical signal receiving means to control a level of the extracted modulation signal component.

* * * * *

UNITED STATES PATENT AND TRADEMARK OFFICE
CERTIFICATE OF CORRECTION

PATENT NO. : 5,003,626

DATED : March 26, 1991

INVENTOR(S) : Hideo Kuwahara et al.

It is certified that error appears in the above-identified patent and that said Letters Patent is hereby corrected as shown below:

```
Col. 1, line 39, after "noise" insert --or noise
intensity--;
        line 61, after "a" insert --balanced--;
        line 62, delete "balanced".
Col. 3, line 52, delete "thus".
Col. 6, line 14, before "optical" insert --outputs
        of--;
        line 15, before "elements" insert
           --outputs of--;
```

UNITED STATES PATENT AND TRADEMARK OFFICE
CERTIFICATE OF CORRECTION

PATENT NO.  : 5,003,626

DATED       : March 26, 1991

INVENTOR(S) : Hideo Kuwahara et al.

It is certified that error appears in the above-identified patent and that said Letters Patent is hereby corrected as shown below:

Col. 5, line 43, after "$S_\ell$" insert a period.

Col. 7, line 11, after "oscillation" insert
--laser 134 is projected via the input fiber 127, onto--;

line 37, before "optical" insert --outputs of--;

Signed and Sealed this

Second Day of February, 1993

Attest:

STEPHEN G. KUNIN

Attesting Officer

Acting Commissioner of Patents and Trademarks